United States Patent
Lamouroux et al.

(10) Patent No.: US 9,604,886 B2
(45) Date of Patent: Mar. 28, 2017

(54) CERAMIC MATRIX COMPOSITE MATERIAL PART

(71) Applicants: HERAKLES, Le Haillan (FR); CENTRE NATIONAL DE LA RECHERCHE SCIENTIFIQUE, Paris (FR)

(72) Inventors: Franck Lamouroux, Le Taillan Medoc (FR); Sebastien Bertrand, Moulis En Medoc (FR); Sylvain Jacques, Talence (FR); Caroline Louchet, Arsac (FR)

(73) Assignees: HERAKLES, Le Haillan (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 341 days.

(21) Appl. No.: 14/365,252

(22) PCT Filed: Nov. 22, 2012

(86) PCT No.: PCT/FR2012/052702
§ 371 (c)(1),
(2) Date: Jun. 13, 2014

(87) PCT Pub. No.: WO2013/088015
PCT Pub. Date: Jun. 20, 2013

(65) Prior Publication Data
US 2014/0363663 A1    Dec. 11, 2014

(30) Foreign Application Priority Data
Dec. 13, 2011    (FR) ..................................... 11 61522

(51) Int. Cl.
*C04B 35/80* (2006.01)
*C04B 35/563* (2006.01)
(Continued)

(52) U.S. Cl.
CPC ............ *C04B 35/806* (2013.01); *B82Y 30/00* (2013.01); *C04B 35/563* (2013.01);
(Continued)

(58) Field of Classification Search
CPC ....... C04B 35/83; C04B 35/80; C04B 35/563; C04B 2235/3821; C04B 35/6286;
(Continued)

(56) References Cited

U.S. PATENT DOCUMENTS

| 4,752,503 A | 6/1988 | Thebault |
| 5,026,604 A | 6/1991 | Thebault |

(Continued)

FOREIGN PATENT DOCUMENTS

| FR | 2710635 A1 | 4/1995 |
| JP | H02106337 A | 4/1990 |

(Continued)

OTHER PUBLICATIONS

Naslain et al., "Processing of Ceramic Matrix Composites by Pulsed-CVI and Related Techniques", Key Engineering Materials, 1999, pp. 359-366, vols. 159-160, Trans Tech Publications, Switzerland.*

(Continued)

*Primary Examiner* — Jennifer Chriss
*Assistant Examiner* — Rebecca Janssen
(74) *Attorney, Agent, or Firm* — Workman Nydegger

(57) ABSTRACT

A part made of ceramic matrix composite material has fiber reinforcement of carbon or ceramic fibers and a majority-ceramic sequenced matrix having first matrix layers made of crack-deflector material alternating with second matrix layers made of ceramic material. An interphase coating is interposed between the fibers and the matrix, and the interphase coating adheres to the fibers and to the matrix, and is formed of at least one sequence constituted by a first (Continued)

elementary layer made of carbon, possibly doped with boron, surmounted by a second elementary layer made of ceramic. The outer elementary interphase layer of the coating is a ceramic layer having an outer surface formed by ceramic grains of size lying essentially in the range 20 nm to 200 nm, with the presence of grains of size greater than 50 nm conferring roughness on the outer surface ensuring mechanical attachment with the adjacent matrix phase.

7 Claims, 5 Drawing Sheets

(51) Int. Cl.
  *C04B 35/565* (2006.01)
  *C04B 35/628* (2006.01)
  *B82Y 30/00* (2011.01)

(52) U.S. Cl.
  CPC ........ *C04B 35/565* (2013.01); *C04B 35/6286* (2013.01); *C04B 35/62863* (2013.01); *C04B 35/62873* (2013.01); *C04B 35/62884* (2013.01); *C04B 35/62894* (2013.01); *C04B 35/62897* (2013.01); *C04B 35/803* (2013.01); *C04B 2235/3821* (2013.01); *C04B 2235/3826* (2013.01); *C04B 2235/5248* (2013.01); *C04B 2235/614* (2013.01); *C04B 2235/781* (2013.01); *C04B 2235/96* (2013.01); *Y10T 428/259* (2015.01)

(58) Field of Classification Search
  CPC ........ C04B 35/62863; C04B 35/62873; C04B 35/62884; C04B 35/62894; C04B 35/62897; C04B 35/803; C04B 35/806; C04B 2235/5248
  See application file for complete search history.

(56) References Cited

U.S. PATENT DOCUMENTS

| | | | |
|---|---|---|---|
| 5,051,300 A | | 9/1991 | Rousseau |
| 5,071,679 A | | 12/1991 | Heraud et al. |
| 5,079,039 A | * | 1/1992 | Heraud ............ C04B 35/80 427/249.1 |
| 5,284,685 A | | 2/1994 | Rousseau et al. |
| 5,476,685 A | | 12/1995 | Rocher et al. |
| 5,738,951 A | | 4/1998 | Goujard et al. |
| 5,965,266 A | * | 10/1999 | Goujard ............ C04B 35/013 427/228 |
| 6,068,930 A | * | 5/2000 | Lamouroux ........ C04B 35/563 264/29.1 |
| 2010/0015428 A1 | * | 1/2010 | Philippe ............ C04B 35/571 428/293.4 |

FOREIGN PATENT DOCUMENTS

| | | |
|---|---|---|
| JP | 2000515840 A | 11/2000 |
| JP | 2008239404 A | 10/2008 |

OTHER PUBLICATIONS

Bertrand et al., "Influence of Strong Fiber/Coating Interfaces on the Mechanical Behavior and Lifetime of Hi-Nicalon/(PyC/Sic)n/SiC Minicomposites", Journal of the American Ceramic Society, Apr. 2001, pp. 787-794, vol. 84, No. 4.*
International Search Report from corresponding International PCT Application No. PCT/FR2012/052702, Jun. 5, 2013.
Nozawa et al., "Tensile, Flexural, and Shear Properties of Neutron Irradiated SiC/SiC Composites with Different Fiber-Matrix Interfaces", Journal of ASTM International, Mar. 2005, pp. 392-404, vol. 2, No. 3.
Hinoki et al., "The Effect of Neutron-Irradiation on the Shear Properties of SiC/SiC Composites with Varied Interface", Journal of Nuclear Materials, vols. 283-287, 2000, pp. 376-379.
Japanese Office Action from Japanese Application No. 2014-546599, Oct. 25, 2016.

* cited by examiner

CERAMIC MATRIX COMPOSITE MATERIAL PART

BACKGROUND OF THE INVENTION

The invention relates to parts made of ceramic matrix composite (CMC) material. The term "CMC material part" is used herein to mean a part made of a material comprising fiber reinforcement made of carbon or ceramic fibers that has been densified by a matrix comprising at least a majority of ceramic.

CMC material parts are used in various applications, in particular in the fields of aviation and space, where they are used because of their thermostructural properties, i.e. their capacity to constitute structural elements because of their mechanical strength, in particular in bending, in traction, and against impacts, which is much greater than that of solid ceramics, combined with their capacity to conserve this mechanical strength up to temperatures that are high, well above 1000° C.

In CMC materials, cracking of the matrix is inevitable in practice, often as from fabrication.

Proposals have been made to interpose an interphase coating between the fibers and the matrix, which coating is capable of transferring load effectively between the matrix and the fibers and is made of a material that is capable of deflecting cracks reaching the interphase coating so as to prevent cracks that are propagating in the matrix from reaching the reinforcing fibers and causing them to break, since that rapidly degrades the mechanical properties of the CMC material. Documents U.S. Pat. No. 4,752,503 and U.S. Pat. No. 5,026,604 disclose making an interphase out of pyrolytic carbon (PyC) or boron nitride (BN) having a structure that is lamellar or made up of lamellae. It is also known to make a crack-deflector interphase out of porous material.

Nevertheless, in utilization conditions under an oxidizing atmosphere and at high temperature, cracks propagating as far as the interphase provide paths giving access to oxygen, and the PyC or BN interphase can then oxidize, as indeed can the underlying fibers if they are made of carbon, thereby degrading the CMC material.

A first known approach for improving resistance against oxidation consists in making a sequenced interphase with alternating nanometric layers of crack-deflector material, such as PyC or BN, and nanometric layers of material having an oxidation protection function, in particular a material such as silicon carbide (SiC) or an Si—B—C ternary system capable, in the presence of oxygen, of forming a vitreous compound capable of healing cracks by passing to the pasty state at the high temperatures to which the CMC material is exposed. Reference may be made to document U.S. Pat. No. 5,738,951 which, for an SiC matrix composite material, describes forming such a sequenced interphase by pulsed chemical vapor infiltration (P-CVI) in which the elementary layers of the interphase have a thickness of less than 10 nanometers (nm).

Using P-CVI to form a sequenced interfaces of the $(PyC-SiC)_n$ type is also described in documents by Sébastien BERTRAND et al.: "Influence of strong fiber/coating interfaces on the mechanical behavior and lifetime of Hi-Nicalon/$(PyC-SiC)n$/SiC minicomposites", Journal of the American Ceramic Society, Blackwell Publishing, MALDEN, Mass., US, vol. 84, N° 4, Apr. 1, 2011 (2001-04-01), pages 787-794, and by Roger NASLAIN et al.: "Processing of ceramic matrix composites by pulsed-CVI and related techniques", Key Engineering Materials, Trans Tech Publications Ltd., STAFA-ZURICH, CH, Vol. 159-160, Jan. 1, 1999 (1999-01-01), pages 359-365.

In those two documents, the composites described are mini-composites or micro-composites with unidirectional reinforcement.

The document by Takashi NOZAWA et al.: "Tensile, flexural, and shear properties of neutron irradiated SiC/SiC composites with different fiber-matrix interfaces", STP/ASTM International, ASTM International, WEST CONSHOHOCKEN, Pa., 2001, US, Vol. 1475 STP, Jan. 1, 2004 (2004-01-01), pages 392-404, also mentions mini-composites with unidirectional fiber reinforcement and an SiC matrix, together with an interphase of $(SiC-PyC)_n$ type, the composites being made by an isothermal CVI process, without further details.

A second known approach consists in incorporating, in the matrix, one or more faces of a material capable of conferring self-healing properties on the matrix so as to prevent or slow down the propagation of cracks within the matrix, where such phases are made in particular out of boron carbide $B_4C$ or out of an Si—B—C ternary system. Reference may be made to document U.S. Pat. No. 5,965,266, which describes a matrix made up of SiC phases alternating with phases of $B_4C$ or of Si—B—C.

A third known approach consists in making a sequenced matrix comprising layers of crack-defector material, e.g. PyC or BN, alternating with the layers of ceramic material, the deflection of cracks within the matrix slowing down the access of an ambient oxidizing medium to the interphase or to the fibers. Reference may be made to document U.S. Pat. No. 6,068,930.

A fourth known approach consists in making an interphase of PyC or of BN with little anisotropy in order to enable strong bonding with a matrix or a matrix layer made of ceramic, in particular of SiC, such that the breaking strengths in shear within the interphase layer and at the fiber-interphase and interphase-matrix bonds are greater than those encountered within the matrix.

OBJECT AND SUMMARY OF THE INVENTION

An object of the invention is to propose a CMC material part having an improved lifetime, in particular when exposed under load to an oxidizing medium at high temperature.

This object is achieved by a part made of ceramic matrix composite material having fiber reinforcement of carbon or ceramic fibers and a majority-ceramic sequenced matrix having first matrix layers made of crack-deflector material alternating with second matrix layers made of ceramic material, in which part an interphase coating is interposed between the fibers and the matrix, the interphase coating adhering to the fibers and to the matrix and being formed of at least one sequence constituted by a first elementary interphase layer made of carbon, possibly doped with boron, surmounted by a second elementary interphase layer made of ceramic, the outer elementary layer of the interphase coating being a ceramic layer having an outer surface formed by ceramic grains of size lying essentially in the range 20 nm to 200 nm, with the presence of grains of size greater than 50 nm conferring roughness on the outer surface ensuring mechanical attachment with the adjacent matrix layer.

The attachment of the sequenced matrix on the interphase coating enhances the transfer of loads between the matrix and the fibers, which is important from the points of view of the mechanical strength of the part and of its lifetime in an oxidizing environment. Preferably, the bond between the interphase coating and the matrix presents breaking strength in shear that is greater than the strengths encountered within the matrix. Advantageously, damage by cracking is diverted into the sequenced matrix and does not occur in preferred manner at the interphase. Because of the sequencing of the matrix, this damage is in the form of a combination of cracking mode I (cracks propagating transversely in a ceramic matrix layer) and cracking mode II (cracks propagating along a layer of crack-deflector material), thereby delaying exposure of the interphase coating to the oxygen of the ambient medium via the network of cracks. The lifetime of the parts is thus increased.

Advantageously, the matrix layer situated closest to the interphase coating is a layer of crack-deflector material.

In an embodiment, the interphase coating is made of first elementary layers of boron-doped carbon alternating with second elementary layers of ceramic, and in each first elementary layer, the atomic percentage of boron lies in the range 5% to 20%.

The or each first elementary layer of the interphase coating may have mean thickness lying in the range 20 nm to 500 nm.

In an embodiment, the or each second elementary layer of the interphase coating is made of silicon carbide.

The or each second elementary layer of the interphase coating may have mean thickness lying in the range 20 nm to 500 nm.

The total mean thickness of the interphase coating may lie in the range 0.10 micrometers (µm) to 4 µm, in average value.

A method of fabricating a CMC material part as defined above comprises:
  making a fiber preform out of carbon or ceramic fibers to constitute the fiber reinforcement of the part;
  using chemical vapor infiltration to form the interphase coating on the fibers of the preform, the interphase coating comprising at least one sequence constituted by a first elementary layer of optionally boron-doped pyrolytic carbon surmounted by a second elementary layer of ceramic; and
  densifying the fiber preform coated with the interphase coating by means of the mostly-ceramic sequenced matrix.

In an implementation of the method, the or each first elementary interphase layer of the coating may be made from a gas in which the carbon precursor is propane, when the first elementary layer is made of boron-doped carbon.

In another implementation of the method, the or each first elementary interphase layer of the coating may be made from a gas in which the carbon precursor is methane or natural gas, when the first elementary layer is made of carbon on its own.

Advantageously, the fiber preform is consolidated by the interphase coating, i.e. the interphase coating bonds the fibers of the preform together so that the preform is sufficiently rigid to be capable of being manipulated while conserving its shape without assistance from support tooling.

BRIEF DESCRIPTION OF THE DRAWINGS

Other features and advantages invention appear on reading the description made below by way of non-limiting example and with reference to the accompanying drawings, in which.

DETAILED DESCRIPTION OF THE INVENTION

Figure 1:
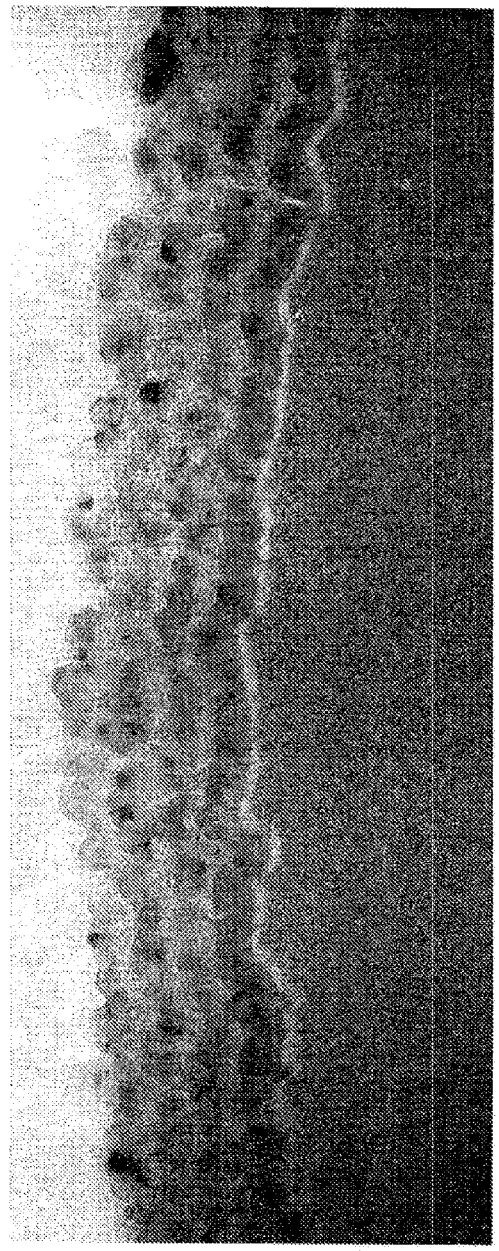
FIGS. 1 to 4 are microscope views showing interphase coatings for parts made of CMC material in accordance with the invention.

A first step in making a CMC material part in accordance of the invention consists in making a fiber preform for constituting the fiber reinforcement of the part that is to be made and thus having a shape that corresponds to the shape of that part.

The preform is made of carbon or ceramic fibers, with the fibers being based on silicon carbide SiC, for example, when the fibers are ceramic fibers.

Various methods of preparing fiber preforms are well-known.

Preforms may be made from unidimensional fiber structures such as yarns, tows, or rovings, e.g. by filamentary winding or by multilayer weaving (three-dimensional weaving) possibly followed by a shaping step.

Is also possible to start from two-dimensional fiber structures such as two-dimensional fabrics or sheets of yarns or tows for forming plies that are draped over a shaper and possibly bonded together, e.g. by needling, by stitching, or by implanting yarns.

It is also possible to start from three-dimensional fiber structures, such as felts.

Under all circumstances, a preform of complex shape may be made by assembling together various preform portions, e.g. by stitching.

Likewise under all circumstances, the preform may be made of fibers which are themselves made of a polymer that is a precursor of carbon or of ceramic, with the precursor subsequently being transformed into carbon or ceramic by heat treatment.

A second step consists in forming an interphase coating on the fibers of the preform, generally while the preform is being held in its shape by means of tooling. The interphase coating is a multilayer coating formed by a conventional chemical vapor infiltration (CVI) process. CVI processes are well-known. They consist in placing a porous preform in an enclosure into which a reaction gas is admitted, which gas, under specified conditions in particular of temperature and pressure, diffuses into the pores of the preform, and on coming into contact with the pores, forms a deposit of the desired material by means of one or more components of the gas decomposing, or by means of a plurality of components of the gas reacting together.

In known manner, in a conventional CVI process, the gas flows continuously through the enclosure, which is maintained at a pressure that is constant or substantially constant (an isobaric or quasi-isobaric CVI process).

In the present invention, the interphase coating is formed by at least one sequence constituted by a first elementary layer of carbon, possibly with boron doping, and covered by a second elementary layer of ceramic.

A first elementary layer of the interphase coating that is formed solely of carbon is advantageously a layer of pyrolytic carbon (PyC) formed by CVI in which the carbon precursor contained in the reaction gas is methane or natural gas.

When the first elementary layer of the interphase coating is formed solely of PyC, the interphase coating may be formed by a single sequence constituted by an elementary layer of PyC covered by an elementary layer of ceramic.

A first elementary layer of the interphase coating formed of boron-doped carbon (BC) is advantageously a layer formed by CVI in which the gaseous carbon precursor contained in the reaction gas is propane. The gaseous precursor of boron contained in the gas may for example be boron trichloride $BCl_3$. The respective properties of the carbon precursor and of the boron precursor in the reaction gas are preferably selected in such a manner as to obtain an atomic percentage of boron lying in the range 5% to 20% in the layer of BC.

When the first elementary layer of the interphase coating is a layer of BC, the interphase coating is preferably multi-sequenced, i.e. made up of a plurality of first elementary layers of BC alternating with a plurality of second elementary layers of ceramic.

The optionally boron-doped carbon, in the or each first elementary layer of interphase is advantageously PyC having microstructure of the smooth or rough laminar type with an extinction angle greater than 12°, the type of microstructure being observable by illumination under polarized light causing "Maltese-Cross" shaped patterns to appear, with the extinction angle being the angle of rotation of the polarization that causes the pattern to be extinguished, as is well known.

By way of example, the or each second elementary layer of ceramic is a layer of silicon carbide SiC. It is possible to envisage using other ceramic materials, e.g. silicon nitride or refractory oxides.

As is well known, a layer of SiC may be formed by CVI using a gas that contains a mixture of methyl trichlorosilane (MTS) and of hydrogen gas $H_2$.

In accordance with the invention, the interphase coating is formed in such a manner that the last-formed elementary layer is a ceramic layer with its outer surface being made up of ceramic grains of sizes lying in essentially in the range 20 nm to 200 nm, with grains being present that have a size greater than 50 nm, thereby imparting relatively great roughness to this surface so as to provide mechanical attachment for the first matrix layer. The term "grains of sizes lying in essentially in the range 20 nm to 200 nm" is used herein to mean that more than 80% of the ceramic grains are of a size lying in this range. Furthermore, the presence of grains of a size greater than 50 nm should preferably be significant, i.e. should represent at least 20% of the ceramic layer.

The mean thickness of the or each first elementary interphase layer of optionally boron-doped carbon preferably lies in the range 20 nm to 500 nm.

The mean thickness of the or each second elementary interphase layer of ceramic preferably lies in the range 20 nm to 500 nm.

The total mean thickness of the interphase coating preferably lies in the range 0.10 µm to 4 µm, in average value.

This total thickness may be selected in such a manner as to ensure that the fiber preform is consolidated by the interphase coating on its own, i.e. with an interphase coating bonding together the fibers of the preform sufficiently strongly to obtain a stiffened preform that can be handled while retaining its shape without assistance from support tooling.

Before forming the interphase coating and in order to encourage good attachment of the coating on the fibers, the fiber preform may be subjected to heat treatment as described in document U.S. Pat. No. 5,476,685 when it is made of carbon fibers, or it may be subjected to chemical treatment as described in document U.S. Pat. No. 5,071,679 when it is made of ceramic fibers, in particular fibers made of SiC or essentially of SiC.

The preform with its interphase coating is then densified by means of a sequenced majority-ceramic matrix comprising ceramic layers alternating with layers of crack-deflector material. The layers of crack-deflector material may be made of pyrolytic carbon, possibly doped with boron, or they may be made of boron nitride BN. The ceramic layers may be made of SiC or of an Si—B—C ternary system or of boron carbide $B_4C$. For the ceramic layers, it is possible to alternate between a refractory material such as SiC and a self-healing type material such as Si—B—C or $B_4C$. The term "self-healing material" is used to mean a material that is suitable for generating a vitreous phase by oxidation, thereby providing healing by filling in cracks.

The sequenced matrix may be obtained by CVI. Methods of making sequenced matrices are described, in particular in above-mentioned documents U.S. Pat. No. 5,965,266 and U.S. Pat. No. 6,068,930. A sequenced matrix comprising layers of ceramic material is particularly advantageous in that by combining a cracking mode I of cracks extending transversely to the layers of ceramic with a cracking mode of cracks II extending parallel to the layers of crack-deflector material, it delays the exposure of the carbon of the interphase to the oxygen of the ambient medium via the network of cracks.

The matrix layer that is formed first (closest to the interphase coating) is preferably a layer of crack-deflector material. The relatively great roughness of the outer surface of the last-formed elementary layer of interphase coating provides mechanical attachment between the interphase coating and the matrix, advantageously avoiding decohesion occurring preferentially at this location under the effect of stresses, since that would create a passage for the oxygen of the ambient medium leading to the carbon of the interphase coating. Also, and preferably, the breaking strength in shear of the first layer of the matrix that is made out of crack-deflector material is greater than the breaking strength in shear that exists elsewhere within the matrix.

In combination with the mixture of cracking modes within the sequenced matrix, this contributes to improving the lifetime of the CMC material by preserving the integrity of the interphase. Also, this mechanical attachment between the interphase coating and the matrix contributes to providing good load transfer from the matrix to the fibers, which is essential for the mechanical properties of the CMC material.

Embodiments of parts of CMC material of the invention are described below, together with comparative examples.

Example 1

C Fibers, $(BC_{propane}/SiC) \times 4$ Interphase, Matrix of PyC, $B_4C$, SiC, Si—B—C Type Fiber preforms were obtained from a fabric made by multilayer weaving of carbon yarns. The weaving was performed with an interlock type weave so as to increase the delamination strength of the material that was finally obtained. Preforms were obtained by being cut out from the resulting multilayer fabric and by being held between two perforated plates of a graphite shaper so as to present a fiber volume fraction (i.e. the percentage of the apparent volume of the preform occupied by the fibers) generally lying in the range approximately 30% to 50%.

An interphase coating made up of boron-doped pyrolytic carbon layers alternating with SiC layers was made by conventional CVI on the fibers of the preforms. The coating made up of four BC/SiC bi-layers is written (BC/SiC)×4.

Each elementary layer of BC was deposited with a reaction gas containing a mixture of propane $C_3H_8$ and of boron trichloride $BCl_3$ so as to obtain a BC material.

Each elementary layer of SiC was deposited with a reaction gas containing a mixture of MTS and $H_2$.

Processes for depositing layers of BC and of SiC by CVI are described in particular in above-mentioned document U.S. Pat. No. 6,068,930.

The parameters of these processes, and in particular the length of time each elementary layer was being formed, were selected so as to obtain mean thicknesses of the order of 50 nm and 100 nm respectively for the layers of BC and of SiC, giving a mean thickness for the consolidating interphase of approximately 0.6 µm. Nevertheless, it should be observed that these thicknesses vary greatly as a function in particular of location relative to the holes in the perforated plates of the graphite shaper, with proximity to a hole facilitating access for the reaction gas, and thus leading to a thicker layer being formed.

After the interphase coating was formed, the preforms consolidated by the coating were removed from their support tooling and densified by CVI using a matrix with a majority of ceramic constituted by layers of pyrolytic carbon PyC alternating with layers of boron carbide $B_4C$ or silicon carbide SiC or a mixed boron and silicon carbide forming a ternary Si—B—C system, the layers thus forming the following sequence (starting from the matrix layer closest to the interphase):

C/$B_4$C/C/SiC/C/Si—B—C/C/SiC (which may be repeated one or more times) the C phases of crack-deflector material being made of pyrolytic carbon derived from a precursor formed by a mixture of propane and of natural gas; the SiC phases of a refractory ceramic and the Si—B—C and $B_4C$ phases of self-healing ceramic being obtained as described in the above-specified document U.S. Pat. No. 5,965,266.

Figure 2:
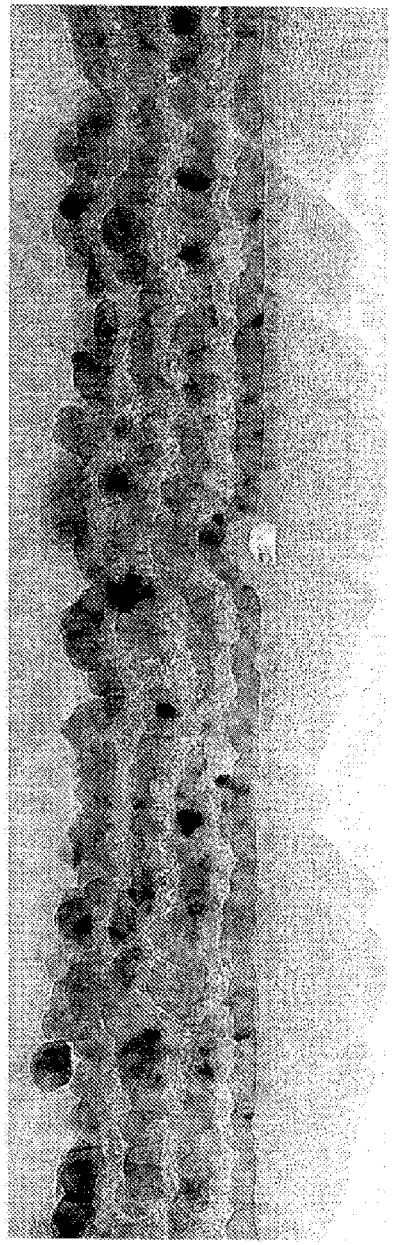
Figure 3:
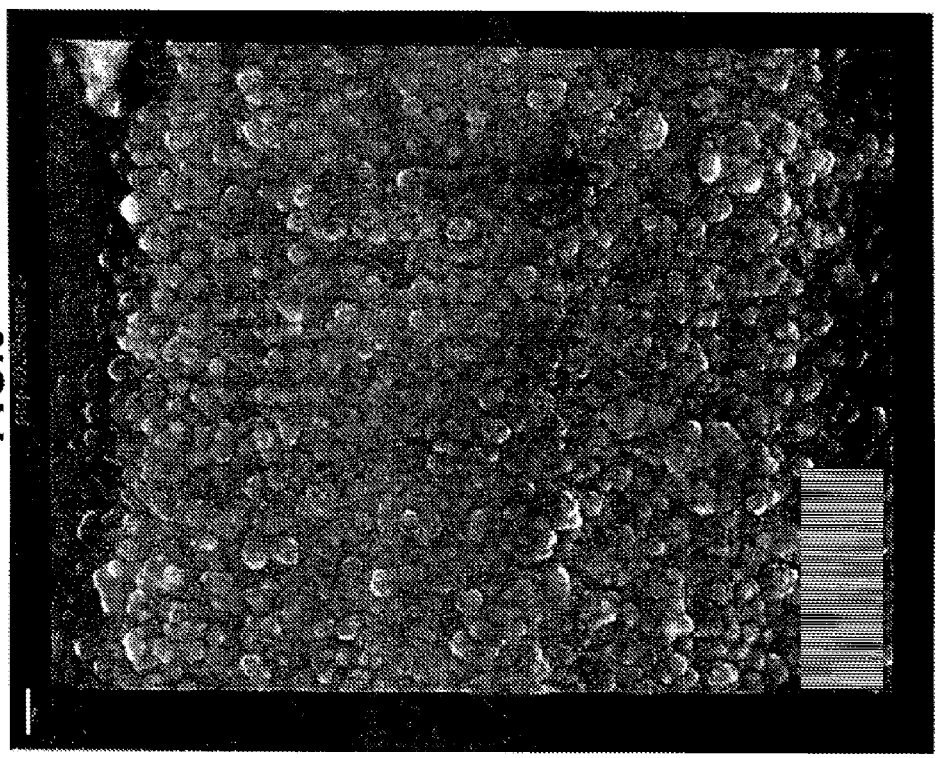

The roughness of the outer surface of the last-formed layer of SiC of the interphase coating is shown in FIGS. 1, 2, and 3, which are microscope views of the interphase coating during the consolidation stage prior to continuing with densification, shown respectively in cross-section, in longitudinal section, and as a surface view. This roughness comes from this SiC layer being formed with grains having a relatively large mean size, in this example greater than 50 nm, and thus with a significant presence of grains of size greater than 50 nm.

Example 2

C Fibers, (BC$_{propane}$/SiC)×4 Interphase, Matrix of BC, $B_4C$, SiC, Si—B—C Type The procedure was the same as in example 1, except for the sequenced matrix in which the pyrolytic carbon PyC of the crack-deflector layers was replaced with boron-doped carbon BC of a nature similar to that of the interphase coating.

Example 3

C Fibers, PyC$_{CH_4}$/SiC Interphase, Matrix of PyC, $B_4C$, SiC, Si—B—C Type

The procedure was the same as in example 1, except for the interphase coating, which was of the PyC/SiC type formed by an elementary layer of PyC covered by an elementary layer of SiC. The elementary layer of PyC was obtained by conventional CVI with a gas in which the carbon precursor was natural gas, i.e. essentially methane. The target mean thicknesses for the layers of PyC and of SiC were respectively about 100 nm and about 1 µm, sufficient for consolidating the preforms.

Figure 4:

FIG. 4 shows that the elementary layer of SiC presents a relatively great surface roughness generated by the presence of coarse grains of SiC having a size greater than 50 nm.

Example 4 (Comparative)

C Fibers, BC/$B_4$C/BC/SiC Interphase, Matrix of PyC, $B_4C$, SiC, Si—B—C Type

The procedure was the same as in example 2 except for the interphase coating which was of the BC/$B_4$C/BC/SiC type, the elementary layers of BC and the elementary layer of SiC being obtained as in example 2, and the elementary layer of $B_4C$ being obtained as for the matrix.

Figure 5:
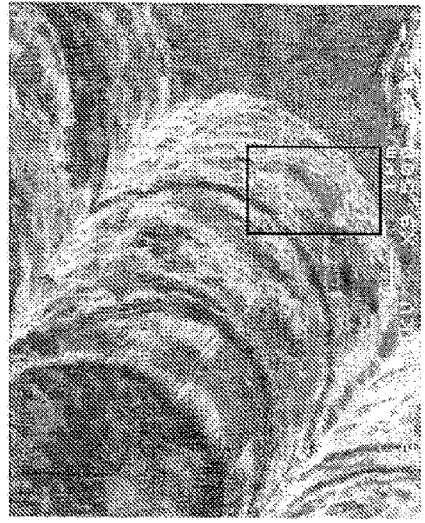
FIGS. 5 to 9 are microscope views showing interphase coatings for parts made of CMC material made for comparison purposes.

FIG. 5 shows that the outer surface of the SiC layer of the interphase coating was relatively smooth.

Example 5 (Comparative)

C Fibers, (BC$_{nat\ gas}$/SiC)×4 Interphase, Matrix of PyC, $B_4C$, SiC, Si—B—C Type The procedure was as in example 2, replacing the carbon precursor for the first layers of the interphase coating with natural gas.

Figure 6:
Figure 7:
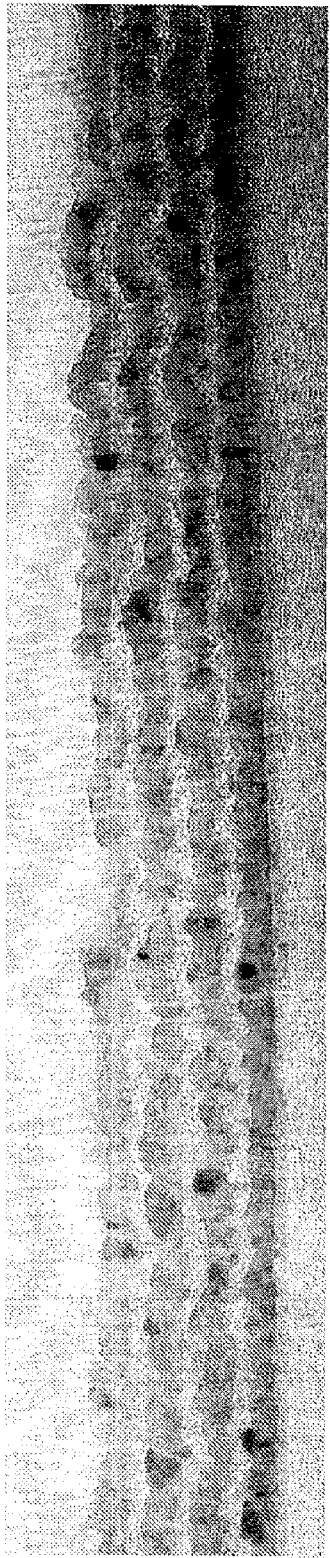
Figure 8:
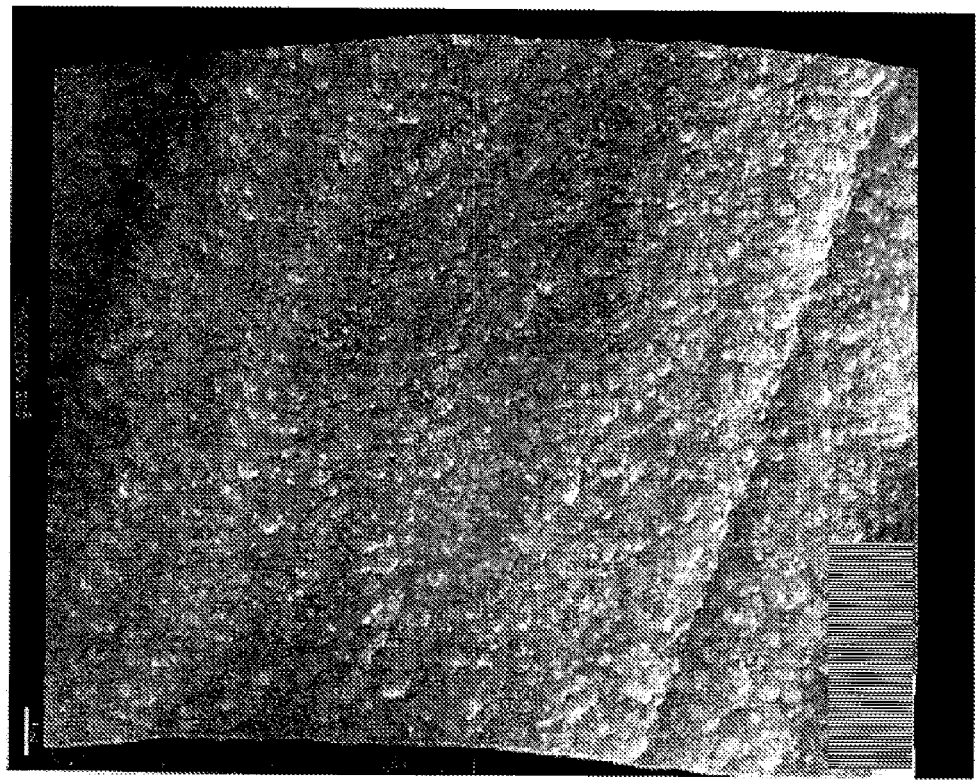

FIGS. 6, 7, and 8 (respectively in cross-section, in longitudinal section, and a surface view) show that the last-formed layer of interphase coating was made up of SiC grains of relatively small size and touching one another, not giving rise to any significant roughness.

When comparing FIGS. 3 and 8, taken on the same scale, the difference in the size of the SiC grains in the last layer of the interphase can easily be seen with suitable image analysis, it is possible to quantify the size of the grains.

Example 6 (Comparative)

C Fibers, (PyC$_{CH_4+C_3H_8}$/SiC)×2 Interphase, Matrix of PyC, $B_4C$, SiC, Si—B—C Type The procedure was the same as in example 3, except for the interphase coating, which was of the (PyC/SiC)×2 type made up of two layers of PyC alternating with two layers of SiC and with elementary layers of PyC obtained by conventional CVI with a gas in which the PyC precursor was a mixture of propane and natural gas, the propane being the main precursor.

The overall thickness of the interphase was selected so as to be similar to that of example 3, i.e. sufficient for consolidating the preforms.

Figure 9:
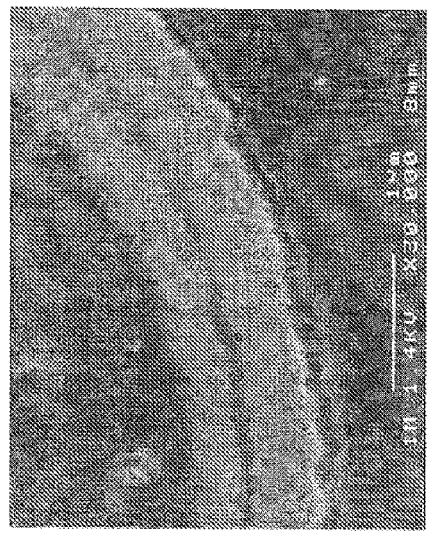

FIG. 9 shows that the outer elementary layer of PyC presents little roughness, the grains of SiC being of relatively small size and touching one another.

Tests

Figure 10:
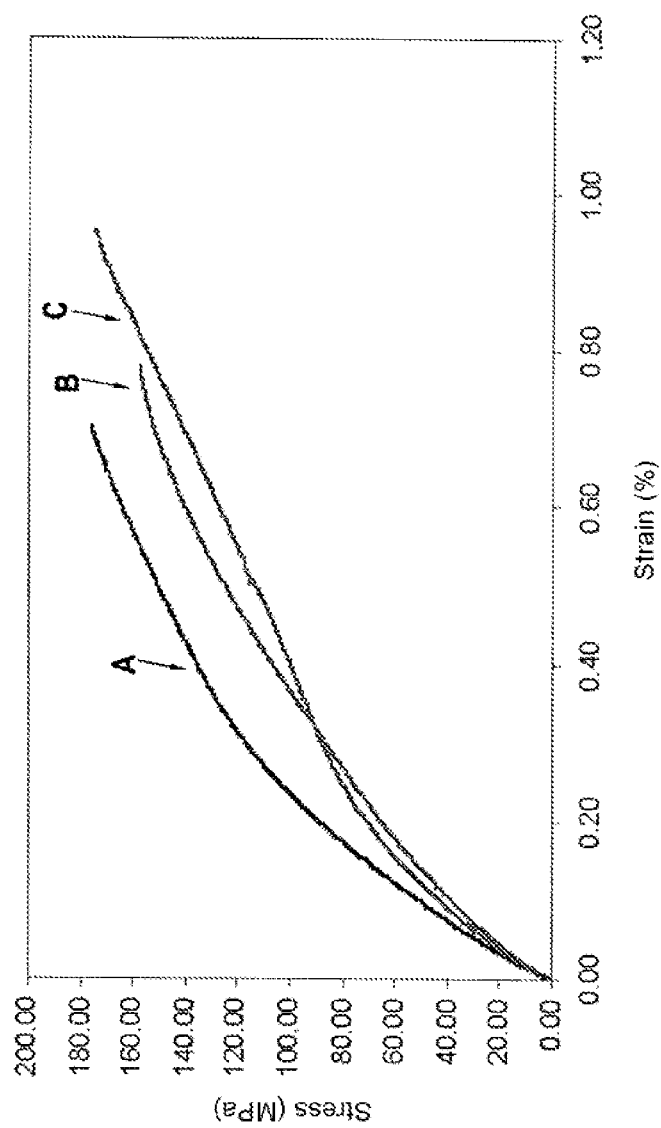
FIG. 10 plots curves presenting the relationship between traction stress and strain for various parts made of CMC material.

Parts obtained in accordance with examples 1, 3, and 6 were subjected to traction tests. Curves A, B, and C in FIG. 10 show the relationship between traction stress and relative elongation shown for the parts of examples 1, 3, and 6 respectively, up to breakage. The linear shape of curve C over the greater fraction of its length, up to breakage, represents decohesion between the interphase coating and the matrix, and thus a smaller transfer of load between the matrix and the fibers.

Parts obtained in accordance with examples 1, 3, and 6 were also subjected to cyclic fatigue lifetime tests at 600° C. and 1200° C. in air, those tests consisting in subjecting the parts to a traction stress of 120 megapascals (MPa) (apparent stress) with stress being relaxed at a frequency of 0.25 hertz (Hz).

The table below gives the results obtained.

| Part | Lifetime at a temperature of: | |
| --- | --- | --- |
|  | 600° C. | 1200° C. |
| Example 1 | >95 h | 35 h |
| Example 3 | >77 h | 10 h |
| Example 6 | 26 h | 17 h |

The lifetimes of the parts obtained in accordance with examples of 1 and 3 are much longer than the lifetime of the parts obtained in accordance with example 6 at 600° C. At 1200° C., the lifetime of the part obtained in accordance with example 3 is shorter, which may be explained by the greater sensitivity to oxidation of PyC obtained from a natural gas precursor.

Parts obtained in accordance with examples 2 and 4 were subjected to cyclic fatigue lifetime testing at 600° C. under the same conditions as those mentioned above.

The table below gives the results obtained.

| Part | Lifetime at 600° C. |
| --- | --- |
| Example 2 | >74 h |
| Example 4 | 20 h |

It can be seen that at 600° C. the behavior of the part of example 2 is better than that of the part of example 4, indicating that with first elementary layers of the interphase made of BC, it is preferable for there to be a plurality of layers of SiC present, the layer of amorphous $B_4C$ not contributing to generating roughness.

Parts obtained in accordance with examples 2 and 5 were subjected to cyclic fatigue lifetime testing at 600° C. under the same conditions as those mentioned above, except for the applied stress that was 90 MPa or 130 MPa.

The table below gives the results obtained.

| Part | Lifetime at 600° C. for a stress of: | |
| --- | --- | --- |
|  | 90 MPa | 130 MPa |
| Example 2 | >500 h | >250 h |
| Example 5 | 288 h, 383 h, >500 h | 87 h, 185 h |

It can be seen that there is considerable dispersion in the results obtained with parts in accordance with example 5, these results being generally much less good than those obtained with parts in accordance with example 2, the difference lying with the carbon precursor selected for the elementary interphase layer is made of BC, namely natural gas (or methane) in example 5 and propane in example 2.

The above examples show that surface roughness of the last-formed elementary layer made of ceramic in the interphase coating suitable for providing effective mechanical attachment with the matrix can be obtained by making the interphase coating under conditions that encourage ceramic grains in this last layer to grow instead of germinating, whereas conditions encouraging germination rather than growth generate grains that are relatively small and close together, in which growth is quickly blocked by their proximity.

The invention claimed is:

1. A part made of ceramic matrix composite material comprising:
   fiber reinforcement of carbon or ceramic fibers and a majority-ceramic sequenced matrix having first matrix layers made of crack-deflector material alternating with second matrix layers made of ceramic material;
   wherein an interphase coating is interposed between the fibers and the majority-ceramic sequenced matrix, the interphase coating adhering to the fibers and to the majority-ceramic sequenced matrix and being formed of at least one sequence constituted by a first elementary interphase layer made of carbon surmounted by a second elementary interphase layer made of ceramic, the outer second elementary layer of the interphase coating being a ceramic layer having an outer surface formed by ceramic grains of size lying essentially in the range of 20 nm to 200 nm, with the presence of grains of size greater than 50 nm conferring roughness on the outer surface ensuring mechanical attachment with an adjacent first matrix layer.

2. A part according to claim 1, wherein the first matrix layer adjacent to the interphase coating is made of PyC or BC crack-deflector material.

3. A part according to claim 1, wherein the interphase coating is made of first elementary interphase layers of boron-doped carbon alternating with second elementary interphase layers of ceramic, and in each first elementary interphase layer, the atomic percentage of boron lies in the range of 5% to 20%.

4. A part according to claim 1, wherein the or each first elementary interphase layer of the interphase coating has mean thickness lying in the range of 20 nm to 500 nm.

5. A part according to claim 1, wherein the or each second elementary interphase layer of the interphase coating is made of silicon carbide.

6. A part according to claim 1, wherein the or each second elementary interphase layer of the interphase coating has mean thickness lying in the range of 20 nm to 500 nm.

7. A part according to claim 1, wherein the total mean thickness of the interphase coating lies in the range of 0.10 µm to 4 µm.

* * * * *